A. H. FETZER.
UNIVERSAL JOINT.
APPLICATION FILED NOV. 10, 1908.
955,256.
Patented Apr. 19, 1910.
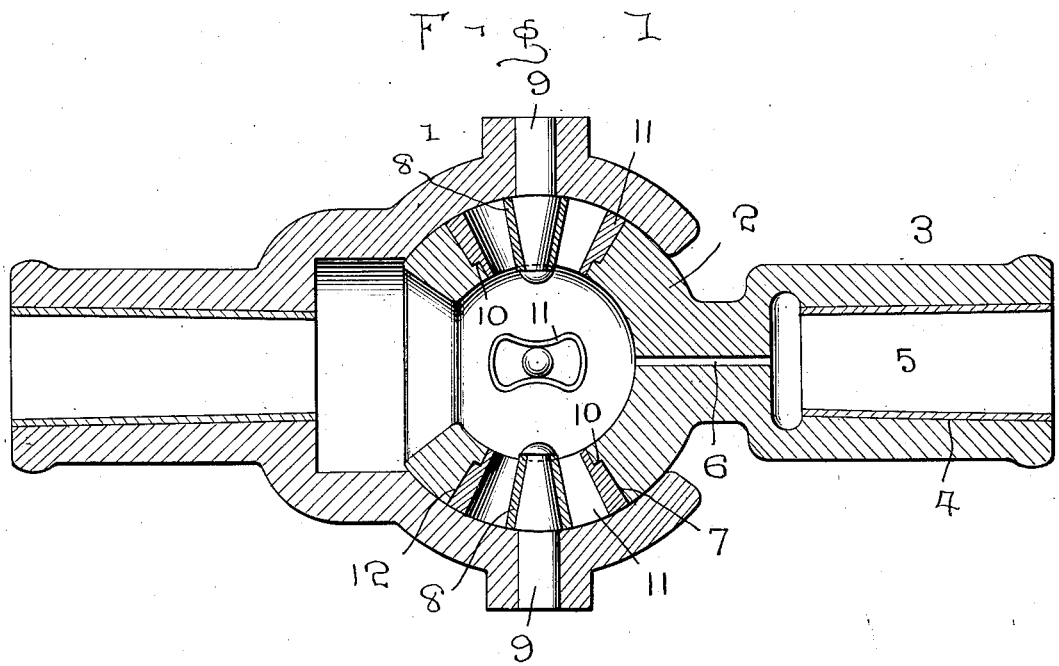
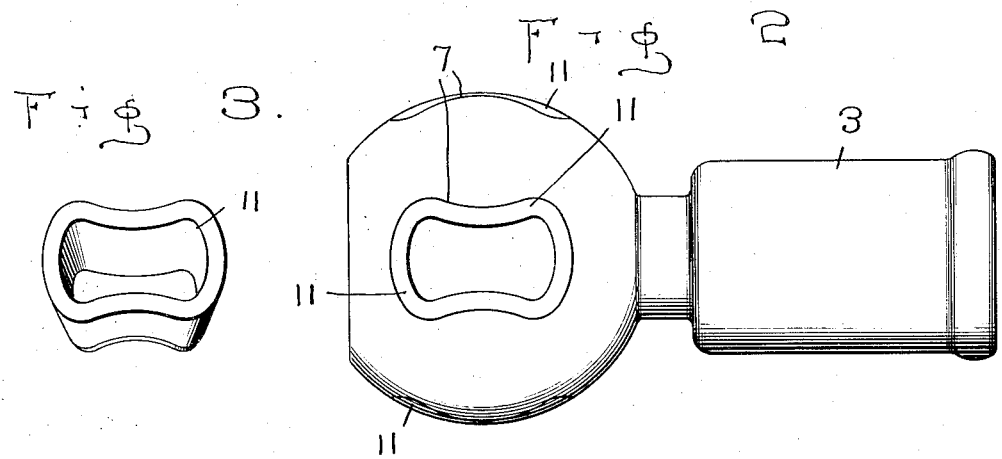
WITNESSES:
INVENTOR
A. H. Fetzer
BY W. J. FitzGerald & Co.,
Attorneys

UNITED STATES PATENT OFFICE.

ALLEN H. FETZER, OF GALION, OHIO.

UNIVERSAL JOINT.

955,256.  Specification of Letters Patent.  Patented Apr. 19, 1910.

Application filed November 10, 1908. Serial No. 461,905.

*To all whom it may concern:*

Be it known that I, ALLEN H. FETZER, a citizen of the United States, residing at Galion, in the county of Crawford and State of Ohio, have invented certain new and useful Improvements in Universal Joints; and I do hereby declare the following to be a full, clear, and exact description of the invention, such as will enable others skilled in the art to which it appertains to make and use the same.

My invention relates to new and useful improvements in universal joints and more particularly for what may be termed a four-wheel drive connection in steering mechanism for motor driven vehicles and has primarily for its object to promote facility and economy in the manufacture of the joint members, whereby the bearing of said parts may be improved and expense lessened in providing for the same.

Said invention further provides for readily lubricating the parts of the bearing or joint.

Other objects and advantages will be hereinafter referred to and more particularly pointed out in the claims.

In the accompanying drawings which are made a part of this application, Figure 1 is a longitudinal sectional view of the invention. Fig. 2 is a side elevation of one member thereof. Fig. 3 is a perspective view of the case-hardened bushing seated in the ball member of the joint connection.

In describing the invention in detail, reference will be had to the accompanying drawings forming part of this specification, wherein like characters of reference denote corresponding parts in the several views.

In carrying out my invention, I form a joint or coupling connection of a socket member 1 and a ball member 2 fitting one within the other, the power transmitting stem portion 3 of said ball member having an angular or square socket 4 receiving a slip sleeve 5. Communicating with said socket 1 is a lubricant conducting passage or duct 6, leading from the hollow or interior of the ball member 2, for delivering the lubricant into said socket, for the requisite lubrication of said sleeve, thus insuring smooth movement or running of the parts.

The ball member 2 has at regular intervals therein, openings 7 primarily for receiving roller bearings 8 carried by journals or shafts 9 seated in the socket member 1. The openings 7, however, have formed in their walls, shoulders 10 near the inner circumference of said ball member 2, preferably of the outline as seen in Fig. 2. These openings 7, such as embraced in my former patents, are each fitted with a bushing 11 having corresponding shoulders or offsets 12, facing and resting against the shoulders 10 for limiting the extent of the inward insertion of said bushing and for the retention of the latter in effective position in the ball member. The bushing 11 is preferably formed of case-hardened metal to provide the walls of the openings 7 in the ball member 2 with effective wearing surface for the roller bearings 8 of the socket member 1. By equipping the openings of said ball member with these case-hardened bushings, provides for the formation or casting of said ball member with said openings from soft or inferior metal and yet furnishes, as above stated, a durable and satisfactory bearing and wearing surface for said roller bearings. Heretofore, however, it has been almost practically impossible to provide suitable bearing or wearing surfaces especially at the aforesaid points in the ball-member of the coupling or joint, owing to the very narrow limits or precincts within which the work has to be done, the ball-member otherwise having to be made wholly of hard metal. My invention, carrying with it the use of the case-hardened metal bushings, obviates these objections or drawbacks as is obvious and at the same time allows the making of the ball-member of inferior or soft metal while possessing durable wearing or bearing surfaces at the points of connection of the socket-member with the ball-member.

I claim:

1. A device of the character described, comprising a ball and socket joint or coupling, the socket-member having inwardly extending trunnion-like bearing rolls, and the ball-member having elongated openings therein whose walls are tapered inwardly and also curved inwardly at the sides, said walls being curved outwardly at the ends, and case-hardened metal bushings applied and conforming to the outlines of the walls of said openings, each bushing being separate and entire from the socket-member and insertible and removable therefrom.

2. A device of the character described, comprising a ball and socket joint or coupling, the socket-member having inwardly extending trunnion-like bearing rolls, and the ball-member having elongated openings whose walls are tapered inwardly and curved inwardly at the sides, said walls being curved outwardly at the ends, and case-hardened metal bushings applied and conforming to the outlines of the walls of said openings, each bushing having a predetermined thickness of wall and forming a separate entirety, and insertible into and removable from said socket-member, the wall of each opening having an outwardly facing shoulder near its inner end, the bushing having an outwardly facing shoulder near its inner narrower end engaging the aforesaid shoulder.

In testimony whereof I have signed my name to this specification in the presence of two subscribing witnesses.

ALLEN H. FETZER.

Witnesses:
C. H. HENKEL,
BERTHA GREBE.